(12) United States Patent
Pfeifer et al.

(10) Patent No.: US 7,313,911 B2
(45) Date of Patent: Jan. 1, 2008

(54) METHOD OF REMOVING NITROGEN OXIDES FROM THE EXHAUST GAS OF A LEAN-BURN INTERNAL COMBUSTION ENGINE AND EXHAUST-GAS PURIFICATION SYSTEM THEREFOR

(75) Inventors: Markus Pfeifer, Solingen (DE); Barry Van Setten, Rodenbach (DE); Paul Spurk, Weiterstadt (DE); Yvonne Demel, Frankfurt (DE); Tobias Kuhl, Hanau (DE); Jürgen Gieshoff, Biebergemünd (DE); Egbert Lox, Hochwaldhausen (DE); Thomas Kreuzer, Karben (DE)

(73) Assignee: Umicore AG & Co. KG, Hanau (DE)

( * ) Notice: Subject to any disclaimer, the term of this patent is extended or adjusted under 35 U.S.C. 154(b) by 0 days.

(21) Appl. No.: 10/547,249

(22) PCT Filed: Feb. 26, 2004

(86) PCT No.: PCT/EP2004/001944

§ 371 (c)(1),
(2), (4) Date: Sep. 18, 2006

(87) PCT Pub. No.: WO2004/076037

PCT Pub. Date: Sep. 10, 2004

(65) Prior Publication Data
US 2007/0051096 A1    Mar. 8, 2007

(30) Foreign Application Priority Data
Feb. 26, 2003   (DE) ............................... 103 08 288

(51) Int. Cl.
*F01N 3/00*   (2006.01)
(52) U.S. Cl. ................. 60/286; 60/274; 60/295; 60/297; 60/301; 60/303; 60/311

(58) Field of Classification Search .................. 60/274, 60/286, 295, 297, 301, 311
See application file for complete search history.

(56) References Cited

U.S. PATENT DOCUMENTS 4,510,265 A * 4/1985 Hartwig ....................... 502/330

(Continued)

FOREIGN PATENT DOCUMENTS

DE   100 11 612 A1   10/2000

(Continued)

OTHER PUBLICATIONS

International Search Report.

*Primary Examiner*—Thomas Denion
*Assistant Examiner*—Diem Tran
(74) *Attorney, Agent, or Firm*—Kalow & Springut LLP; William D. Schmidt

(57) ABSTRACT

The present invention relates to a method of removing nitrogen oxides from the exhaust gas of a lean-burn internal combustion engine by selective catalytic reduction (SCR) using ammonia. The exhaust gas is routed first over a platinum-containing pre-catalyst and then over an SCR catalyst. The ammonia needed for the selective catalytic reduction is added to the exhaust gas upstream of the pre-catalyst at an exhaust-gas temperature below 250° C., while it is supplied to the exhaust gas between the pre-catalyst and the SCR catalyst at an exhaust gas temperature above 150° C. By adopting this procedure, a very large temperature range for the selective catalytic reduction with high nitrogen conversion rates is obtained.

13 Claims, 5 Drawing Sheets

U.S. PATENT DOCUMENTS

| | | |
|---|---|---|
| 4,828,807 A | 5/1989 | Domesle et al. |
| 6,173,568 B1 | 1/2001 | Zurbig et al. |
| 6,314,722 B1 | 11/2001 | Matros et al. |
| 2001/0002244 A1 | 5/2001 | Gieshoff et al. |
| 2002/0039550 A1 | 4/2002 | Schafer-Sindlinger et al. |
| 2002/0054844 A1 | 5/2002 | Pfeifer et al. |
| 2003/0014194 A1 | 1/2003 | Fischer |
| 2003/0209011 A1* | 11/2003 | Duvinage et al. ............. 60/286 |
| 2004/0209769 A1 | 10/2004 | Demel et al. |

FOREIGN PATENT DOCUMENTS

| | | |
|---|---|---|
| EP | 0 666 099 A1 | 8/1995 |
| EP | 1 027 919 A2 | 8/2000 |
| EP | 1 176 290 A1 | 1/2002 |
| JP | 10 156 144 A | 9/1998 |
| JP | 2000265828 A2 | 9/2000 |
| WO | WO 00/74823 A1 | 12/2000 |
| WO | WO 01/64319 A1 | 9/2001 |
| WO | WO 2004/076829 A1 | 9/2004 |

\* cited by examiner

METHOD OF REMOVING NITROGEN OXIDES FROM THE EXHAUST GAS OF A LEAN-BURN INTERNAL COMBUSTION ENGINE AND EXHAUST-GAS PURIFICATION SYSTEM THEREFOR

BACKGROUND OF THE INVENTION

The present invention relates to the removal of nitrogen oxides from the exhaust gas of a lean-burn internal combustion engine and to an exhaust-gas purification system for performing the method. The method relies on the selective catalytic reduction (SCR) of nitrogen oxides using ammonia and on a partial upstream oxidation of nitrogen monoxide to nitrogen dioxide.

Observance of limits planned within the context of EU V in Europe and LEVII in the United States regarding pollutant emissions during operation of internal combustion engines can only be ensured by an active exhaust-gas aftertreatment and exhaust-gas purification, respectively. While the exhaust-gas purification in gasoline engines has largely been solved by the use of three-way catalytic converters, the particulate and nitrogen-oxide emissions from lean-burn internal combustion engines constitute the main problem. In order to convert the nitrogen oxides developed during fuel combustion, two different catalytic methods have been developed: one is the NOx adsorber technology in which, during lean operating states of the engine, nitrogen oxides are adsorbed at a suitable storage material and, at rich operating points, are desorbed and reduced; and the other is the SCR technology in which the nitrogen oxides are reduced using ammonia or a corresponding precursor compound convertible into ammonia.

While the sensitivity to sulfur and the required long-term stability represent two critical issues in the NOx adsorber technologies, the SCR method has in many cases already proved its suitability in long-term use for the removal of nitrogen oxides from power-station exhaust gases. In addition, it appears that according to the present state of the art the NOx conversion rates of partly up to 90% required in future can only be realized by employing the SCR method. Especially in heavy-duty trucks where an operating life of more than 400,000 miles is required SCR systems will very likely be employed.

Due to the high toxicity and volatility of ammonia, nontoxic precursor compounds are preferably used in motor traffic. In particular, aqueous urea solutions are used for this purpose. The urea solution is hydrolyzed to ammonia and carbon dioxide using hydrolysis catalysts or directly on the SCR catalyst. By means of special metering systems upstream of the hydrolysis and the SCR catalyst, respectively, the urea solution is injected or sprayed into the exhaust-gas flow.

The operating temperature of typical SCR catalysts on the basis of the solid acid systems $V_2O_5/WO_3/TiO_2$ and $V_2O_5/MO_3/TiO_2$, respectively, ranges between 300° C. and 550° C. In this range, they achieve nitrogen conversion rates of 90 to 100%. Likewise, the operating temperature of SCR catalysts on the basis of metal-ion exchanged zeolites mostly exceeds 300° C. depending on the metal ion. These catalysts are not very suitable for the conversion of nitrogen oxides at temperatures below 300° C.

The nitrogen oxides contained in the exhaust gas of internal combustion engines consist of 60 to 95 vol. % nitrogen monoxide depending on the operating state of the engine. It is known that the conversion of the nitrogen oxides can be improved in the SCR method if the exhaust gas contains approximately equal volume portions of nitrogen monoxide and nitrogen dioxide.

Therefore, in order to increase the "low-temperature activity" of SCR catalysts, a platinum-containing catalyst is generally arranged upstream of the urea injection site in the exhaust-gas line, which oxidizes part of the engine-generated nitrogen monoxide to nitrogen dioxide. In addition, this upstream oxidation catalyst, under appropriate conditions, almost completely oxidizes the hydrocarbons contained in the raw exhaust gas and prevents these hydrocarbons from diminishing the activity of the SCR catalyst by occupying its active centers. As a result, it is possible to remarkably expand the activity window of the SCR catalysts on the basis of the solid acid systems $V_2O_5/WO_3/TiO_2$ and $V_2O_5/Mo_3/Tio_2$, respectively, and on the basis of metal-ion exchanged zeolites. Generally, such systems achieve full conversion of the nitrogen oxides already from about 250° C.

However, in order to observe future limits, use of SCR systems for purifying the exhaust gases of passenger cars requires high nitrogen conversion rates in the temperature range as low as between 150 and 250° C. Catalysts having operating temperatures for the selective catalytic reduction below 200° C. have previously been described in the literature, for example in [R. M. Heck et al., *Operating Characteristics and Commercial Operating Experience with High Temperature SCR NOx Catalyst*, Environmental progress, 13 (1994) 4, pp. 221-225]. These are platinum-containing catalysts wherein highly dispersed platinum is present on a high surface area support. In the present invention, a high surface area support is generally meant to be a temperature-resistant metal oxide having a specific surface area of more than 10 $m^2/g$. This includes, for example, the so-called active aluminum oxides having specific surface areas between 40 und 400 $m^2/g$.

The range of operation of the platinum-containing catalysts for the selective catalytic reduction is limited towards high temperatures. That is, at temperatures above approximately 300° C., platinum starts oxidizing the ammonia to an increasingly greater extent, thereby removing it from the process of catalytic reduction.

SUMMARY OF THE INVENTION

Thus, there continues to be a demand for a method of removing the nitrogen oxides contained in the exhaust gas of lean-burn internal combustion engines in a wide range of operating temperatures between about 150 to over 550° C. It is the object of the present invention to provide such a method and to make available an exhaust-gas purification system for performing the method. Moreover, this method is intended to be suitable for use in exhaust-gas purification systems having particulate filters and to enable a simplified regeneration of the particulate filter to be done.

This object is solved by a method of selective catalytic reduction (SCR) using ammonia, in which the exhaust gas is first routed over a platinum-containing pre-catalyst and then over an SCR catalyst, the exhaust gas having an exhaust-gas temperature $T_E$ upstream of the pre-catalyst. The method is characterized in that, at an exhaust-gas temperature below a predetermined temperature $T_1$, the ammonia is supplied to the exhaust gas either directly or in the form of a compound hydrolyzable to ammonia upstream of the pre-catalyst, and at an exhaust-gas temperature $T_E$ above $T_1$, it is supplied to the exhaust gas between the pre-catalyst and the SCR catalyst.

DETAILED DESCRIPTION OF THE PREFERRED EMBODIMENTS

In the following description of the method, specific values of the exhaust-gas temperature will be given at which the method is passing from one state to the other. This is done to facilitate a better understanding of the method. However, the person skilled in the art will appreciate that these temperature values depend on the respective catalysts used and, therefore, may have to be adjusted when performing the method in order to achieve optimum results with the method for a given combination of catalysts. As a rule, the temperature $T_1$ for changing the ammonia supply from a supply upstream of the pre-catalyst to a supply between pre-catalyst and SCR catalyst is in a range between 220 and 270° C.

In the present invention, an SCR catalyst is understood to be a conventional catalyst for the selective catalytic reduction having an operating temperature range above 250° C. Preferably, the SCR components of the SCR catalyst include a solid acid system made of titanium dioxide and vanadium. Additionally, this material may contain at least one of the group consisting of tungsten oxide, molybdenum oxide, silicon dioxide, sulfate and zeolites, wherein the zeolites may be present in the acid H-form or be exchanged with metal ions. However, the SCR catalyst may entirely consist of zeolites, wherein the zeolites are present in the acid H-form or are exchanged with metal ions, in particular with iron and copper, within their exchange capacity.

The operating temperature range of the SCR catalyst refers to the temperature range in which the catalyst achieves a conversion rate of at least 50% at a predetermined space velocity and a predetermined molar ratio of nitrogen oxides to ammonia.

In the present method, the platinum-containing pre-catalyst assumes two different functions depending on the exhaust-gas temperature $T_E$. In the low-temperature range below about 250° C., this catalyst is capable of selectively reducing the nitrogen oxides contained in the lean exhaust gas to nitrogen and water when ammonia is supplied as a reducing agent. In this temperature range, the platinum-containing pre-catalyst thus fulfills the function of an SCR catalyst. As a result, conversion of the nitrogen oxides starts very early following the cold start of the engine. But also at any other operating points with a low exhaust-gas temperature, i.e. below 250° C., the pre-catalyst acts as an SCR catalyst. This is of course conditional upon the exhaust gas upstream of the pre-catalyst being supplied with a sufficient amount of ammonia or a compound decomposable into ammonia. The hydrocarbons contained in the exhaust gas serve as a further reducing agent during these operating phases.

During the operating phases at exhaust-gas temperatures below 250° C., the actual SCR catalyst is still too cold to play a major part in the conversion of the nitrogen oxides. In addition, the SCR catalyst is arranged downstream of the pre-catalyst. By this arrangement, the exhaust gas upstream of the SCR catalyst is colder than upstream of the pre-catalyst.

When the exhaust-gas temperature $T_E$ exceeds 250° C., the selective catalytic reduction of the nitrogen oxides at the pre-catalyst gradually changes to oxidation of the ammonia and the hydrocarbons contained in the exhaust gas. Above approximately 250° C., the pre-catalyst no longer acts as an SCR catalyst. The supply of ammonia upstream of the pre-catalyst is therefore stopped. Due to the higher exhaust-gas temperatures, the SCR catalyst becomes active now. For that reason, the reducing agent ammonia or a compound hydrolyzable to ammonia must be added to the exhaust gas between the pre-catalyst and the SCR catalyst.

In order to improve the hydrolysis of the precursor compound of ammonia, a hydrolysis catalyst may be provided downstream of the injection site for the reducing agent but upstream of the SCR catalyst.

If required, the ammonia supply upstream of the pre-catalyst and between the pre-catalyst and the SCR catalyst may be performed in an overlapping manner over a certain temperature range. In this case, the ammonia supplied to the pre-catalyst is burned at the pre-catalyst and contributes to the increase of the exhaust-gas temperature and, therefore, to an earlier light off of the selective catalytic reduction at the SCR catalyst.

Another advantage of the method is that at high exhaust-gas temperatures, the hydrocarbons contained in the exhaust gas are almost completely burned at the pre-catalyst. This prevents fouling of the SCR catalyst by unburned hydrocarbons.

In order to avoid ammonia emissions due to accidental overdosage or ammonia desorption from the SCR catalyst, the exhaust gas downstream of the SCR catalyst may be routed over a so-called ammonia-blocking catalyst. This is a catalyst with an oxidizing function, which oxidizes the ammonia leakage to water and nitrogen. It includes, for example, platinum on a high surface area support. This oxidizing catalyst may also be applied in the form of a coating on the outlet side of the SCR catalyst.

For optimum exhaust-gas treatment, the platinum-containing pre-catalyst is preferably applied in the form of a coating on a honeycomb carrier made of ceramic or metal as is widely used in the catalytic conversion of automotive exhaust gases as a carrier for catalytically active coatings. It preferably includes platinum as a catalytically active noble metal on at least one large surface area support selected from the group consisting of aluminum oxide, silicon oxide, titanium oxide, zirconium oxide, cerium oxide, zeolite or mixtures or mixed oxides thereof. Suitable formulations for the pre-catalyst are described in the German patent applications DE 19614540 A1 and DE 19753738, for example. Essentially, these consist of a platinum-activated aluminum silicate which may contain 0.5 to 40 wt. % silicon dioxide referred to the total weight of the aluminum silicate. In addition, these catalyst formulations also include various temperature-resistant zeolites having a molar ratio between $SiO_2$ and $Al_2O_3$ of more than 10.

In a particular embodiment of the method, a particulate filter for separating soot particles from the exhaust gas is used as a support for the platinum-containing pre-catalyst. The soot particles depositing onto the particulate filter result in a continuous increase of the exhaust-gas backpressure. Accordingly, the particulate filter must be regenerated from time to time, that is, the soot particles deposited onto the particulate filter must be burned off by increasing the exhaust-gas temperature.

Diesel soot burns spontaneously at temperatures from as high as about 600° C. These temperatures in the exhaust gas of modern diesel engines are achieved only in the full load range, however. Despite this, in order to ensure regeneration of soot-loaded filters, active measures for filter regeneration are taken especially in passenger cars. Thus, the exhaust-gas temperature may be increased, for example by in cylinder-post-injection, exhaust-gas burners or microwave heaters. Alternatively or additionally, the activation energy for soot combustion may be lowered by using fuel additives or catalytic filter coatings.

In the above-mentioned embodiment of the method, components may therefore be added to the platinum-containing pre-catalyst, which reduce the ignition temperature of the soot particles. These components may, for example, be rare-earth oxides or mixtures of these oxides. Preferably, components based on cerium oxide are employed to reduced the ignition temperature. The so-called equilibrium temperature, at which equal amounts of soot particles are produced by the engine and burned by the filter, is about 420° C. for an uncoated filter. By using a catalytic coating, this equilibrium temperature can be lowered clearly below 300° C.

In order to regenerate the filter function, the temperature of the exhaust gas must be raised up to the soot ignition temperature. As known in the prior art, this can be done by adopting various measures in the engine in order to increase the hydrocarbon content in the exhaust gas. The additional hydrocarbons will then be burned at the platinum-containing pre-catalyst and will increase the filter's temperature to the soot ignition temperature. Also, additional fuel may be metered into the exhaust gas upstream of the pre-catalyst. Alternatively, according to a particular embodiment of the method, an increasing amount of ammonia may also be injected upstream of the pre-catalyst when the exhaust-gas temperature has exceeded 250° C. In this temperature range, the ammonia is burned at the pre-catalyst, thereby further increasing the exhaust-gas temperature.

Another subject matter of the present invention is an exhaust-gas purification system for performing the method. This exhaust-gas purification system includes a platinum-containing pre-catalyst, and an SCR catalyst disposed downstream thereof. For supplying the reducing agent ammonia, the exhaust-gas purification system comprises a first metering device upstream of the pre-catalyst and a second metering device between the pre-catalyst and the SCR catalyst for adding ammonia or a compound hydrolyzable to ammonia to the exhaust gas of the internal combustion engine.

At temperatures below 250° C. upstream of the pre-catalyst, the reducing agent is metered into the exhaust-gas line through the first metering unit so that it can already react with the nitrogen oxides in the raw gas on the platinum-containing catalyst in an optimum temperature range for that purpose. At temperatures above 250° C. upstream of the pre-catalyst, at which the platinum-containing catalyst starts oxidizing the metered ammonia so that it will no longer be available for the SCR reaction, the reducing agent is now injected through the second metering site upstream of the SCR catalyst and can react with the nitrogen oxides in the exhaust gas within a temperature range which is optimum for the SCR catalyst. At the same time, almost complete oxidation of the hydrocarbons and partial oxidation of nitrogen monoxide to nitrogen dioxide takes place at the pre-catalyst, thereby remarkably increasing the low-temperature activity of the SCR catalyst provided downstream.

In the system described herein, a platinum-containing filter coating, in addition to performing the SCR reaction with ammonia in the temperature range between 150 and 250° C., total oxidation of the hydrocarbons and partial oxidation of nitrogen monoxide, is also designed to activate the soot combustion.

Additionally, it was found that the reducing agent used, i.e. ammonia or precursor compounds decomposable into ammonia, is suitable to actively regenerate the filter by combustion on the coated filter at exhaust-gas temperatures above 300° C. using the heat of oxidation released thereby.

BRIEF DESCRIPTION OF THE FIGURES

The invention will now be explained in more detail referring to FIGS. 1 to 5 and the following Comparative Examples and Examples, wherein:

FIG. 1 schematically shows the construction of an exhaust-gas purification system 1 for performing the method. In an exhaust-gas pipe 2, two converter housings 3 and 4 are disposed. The engine-side converter housing 3 includes the pre-catalyst 5, while the converter housing 4 arranged downstream of the converter 3 includes the SCR catalyst 6. The exhaust-gas purification system comprises two supply inlets 7 and 8 for supplying ammonia or a compound decomposable into ammonia, such as urea, to the exhaust gas. For direct measurement of the exhaust-gas temperature, a temperature sensor 9 is provided upstream of the pre-catalyst in the direction of flow. However, the temperature may alternatively be acquired from the characteristic maps stored in the engine control unit. In this case, a temperature sensor in the exhaust-gas line may be omitted.

COMPARATIVE EXAMPLES AND EXAMPLES

In the following Comparative Examples and Examples, the nitrogen-oxides conversion rates of various catalysts and catalyst combinations were measured depending on the temperature for the gas compositions indicated in Table 1 using a model gas system.

TABLE 1

| Composition of model exhaust gas | |
|---|---|
| Exhaust-gas component | Concentration |
| NO | 500 vppm |
| $NH_3$ | 450 vppm |
| $H_2O$ | 1.3 vol. % |
| $O_2$ | 5.0 vol. % |
| $N_2$ | balance |

For the examinations, a diesel oxidizing catalyst based on stabilized aluminum oxide and a mix of various H-zeolites as well as platinum on a honeycomb carrier of 25.4 mm diameter and 25.4 mm length was used. The cell density of the honeycomb carrier was 62 $cm^{-2}$ at a wall thickness of 0.17 mm. The catalyst included a platinum concentration of 3.18 g per liter of honeycomb volume. The coating concentration was about 100 g/l volume of the honeycomb carrier.

As an SCR catalyst, a vanadium-based catalyst was employed. Here, the SCR active components vanadium and tungsten oxide were fixed on titanium oxide as a support.

The SCR catalyst was applied on a honeycomb carrier three times the length of the diesel oxdiation catalyst.

Comparative Example 1

The nitrogen-oxides conversion of the platinum-containing diesel oxidation catalyst was measured at a space velocity of 90,000 h$^{-1}$. The ammonia needed for the selective catalytic reduction was added to the model gas mixture upstream of the oxidation catalyst.

Figure 1:
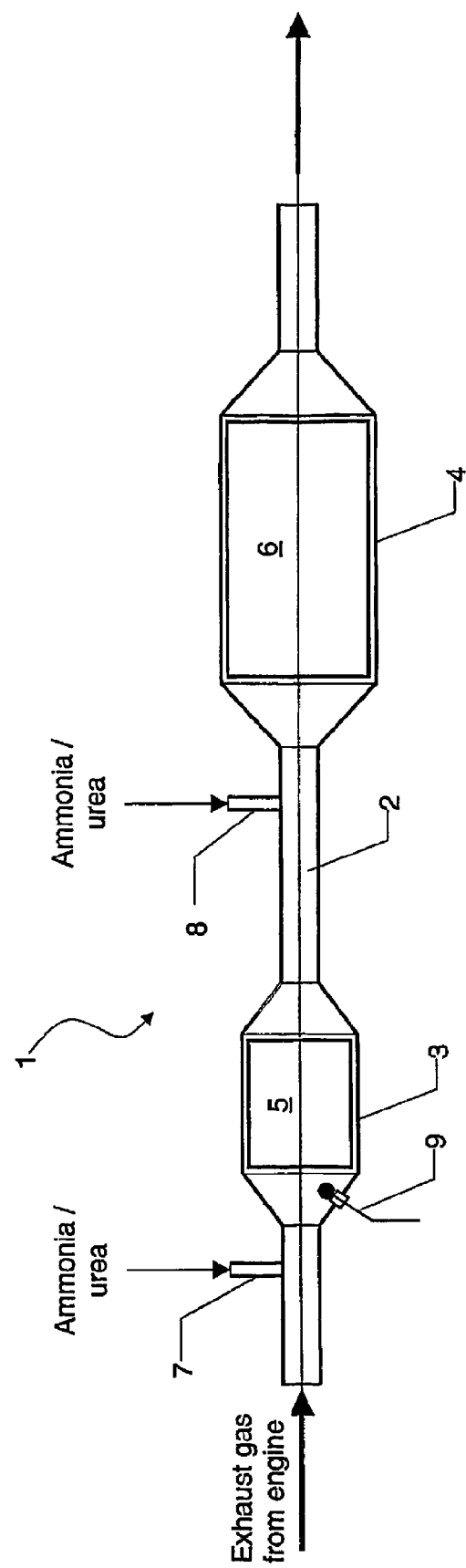
FIG. 1 shows an exhaust-gas purification system according to the invention.
Figure 2:
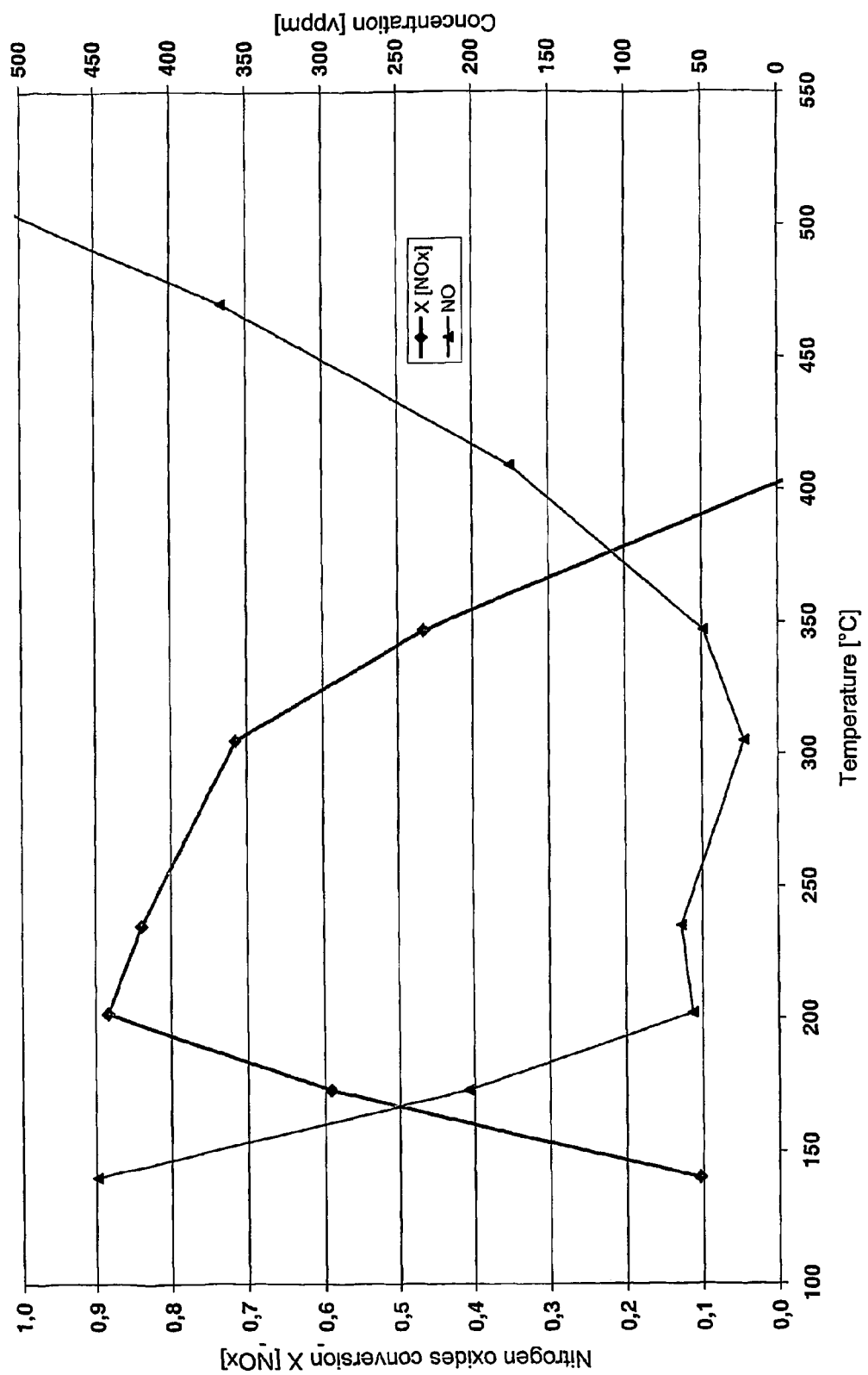
FIG. 2 shows the nitrogen-oxides conversion at a platinum-containing catalyst.

The measured plots are depicted in FIG. 2. As early as at 150° C., the catalyst has a nitrogen-oxides conversion rate of about 20%. The maximum nitrogen-oxides conversion rate of just under 90% occurs at a temperature of approximately 200° C.

Comparative Example 2

Next, the nitrogen oxides conversion of the SCR catalyst was measured at a space velocity of 30,000 h$^{-1}$. The ammonia needed for the selective catalytic reduction was added to the model gas mixture between the pre-catalyst and the SCR catalyst.

Figure 3:
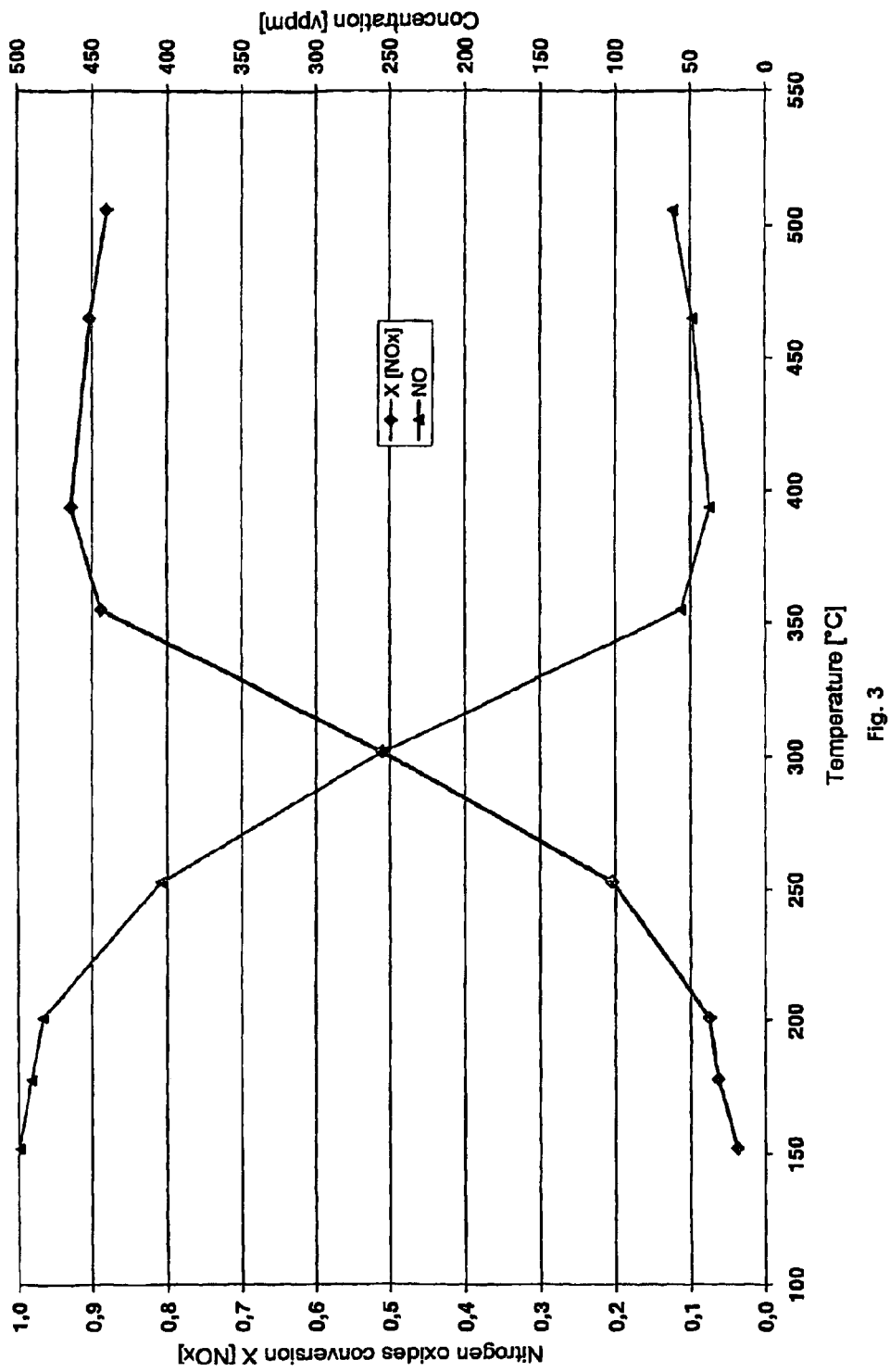
FIG. 3 shows the nitrogen-oxides conversion at an SCR catalyst on the basis of vanadium.

The measuring results are shown in FIG. 3. This catalyst has a nitrogen-oxides conversion rate of 20% as late as at 250° C. The maximum of 93% nitrogen-oxide conversion is reached at a temperature of about 400° C.

Comparative Example 3

In this example, the oxidation catalyst and the SCR catalyst were connected in series and loaded with a space velocity of 30,000 h$^{-1}$ referred to the SCR catalyst. The ammonia needed for the selective catalytic reduction was added to the model gas mixture upstream of the oxidation catalyst for all temperature measuring points.

Figure 4:
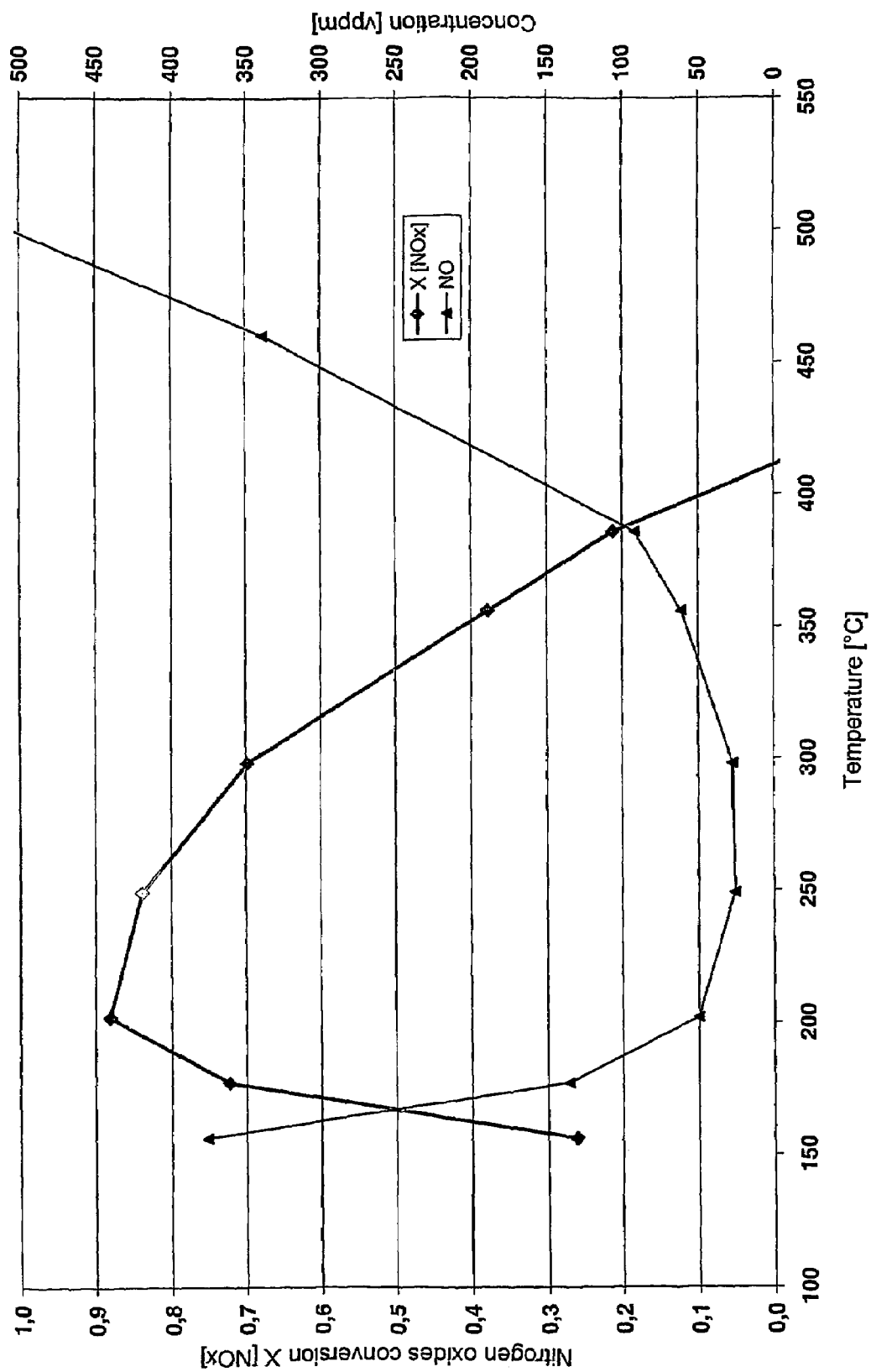
FIG. 4 shows the nitrogen-oxides conversion by an exhaust-gas purification system according to the invention with injection of ammonia upstream of the pre-catalyst.

The corresponding conversion plots are depicted in FIG. 4. Compared to the oxidation catalyst that was used on its own in Comparative example 1, the combination of an oxidation catalyst and an SCR catalyst fails to provide any improvement in the nitrogen-oxide conversion rate, because at exhaust-gas temperatures above 250° C., the ammonia needed at the SCR catalyst is burned by the oxidation catalyst at these temperatures and is no longer available for the selective catalytic reduction.

Example 1

This example also investigated the series connection of an oxidizing catalyst and an SCR catalyst. In this case, however, the ammonia needed for the selective catalytic reduction was added to the model gas mixture upstream of the oxidizing catalyst at temperatures below 250° C., and to the model gas mixture between the oxidizing catalyst and the SCR catalyst at exhaust-gas temperatures above 250° C.

Figure 5:
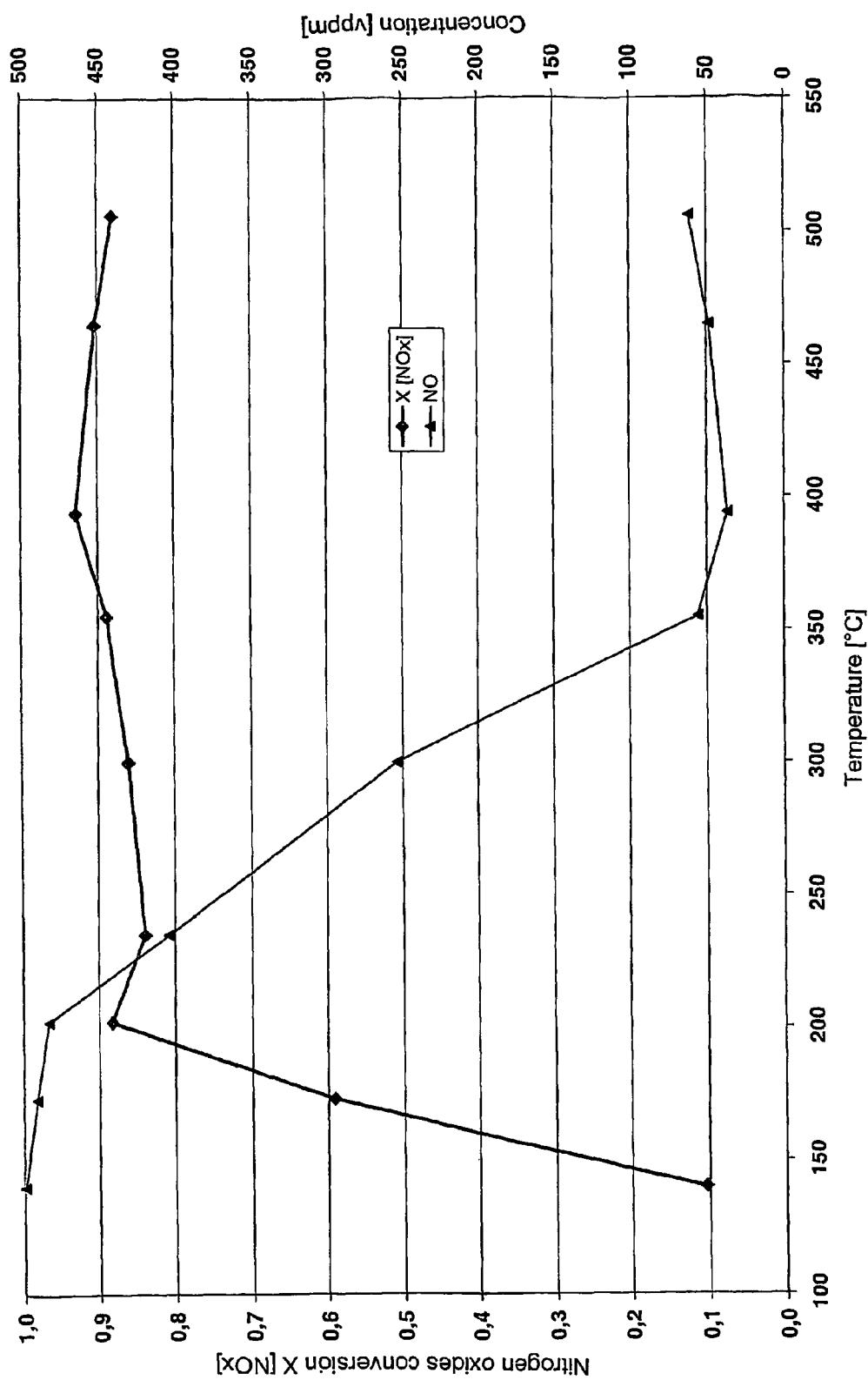
FIG. 5 shows the nitrogen-oxides conversion by an exhaust-gas purification system according to the invention with injection of ammonia up to 250° C. upstream of the pre-catalyst and from 250° C. between the pre-catalyst and the SCR catalyst.

FIG. 5 indicates the associated measuring plots. As shown, the method according to the invention can achieve a nitrogen oxides conversion rate of more than 80% for a very wide temperature range from 200° C. to above 500° C.

Example 2

In order to demonstrate the active regeneration of a particulate filter by burning ammonia on the filter, a particulate filter made of silicon carbide and having dimensions of 143.76×152.4 mm and a cell density of 31 cm$^{-2}$ (5.66"× 61", 200 cpsi) was provided with a catalytic coating which included platinum-activated cerium/zirconium oxide.

The platinum load of the filter was 5.3 l/g (150 g/ft$^3$). The filter was preloaded with 20.1 g diesel soot and tested for its backpressure on a passenger car engine at various load and temperature stages using metered ammonia addition. It was found that at an exhaust-gas temperature between 350 and 400° C. with metered addition of urea solution at a concentration corresponding to approximately 750 ppm ammonia in the exhaust gas, the filter could be completely regenerated within 15 minutes.

What is claimed is:

1. A method of removing nitrogen oxides from the exhaust gas of a lean-burn internal combustion engine by selective catalytic reduction (SCR) using ammonia, wherein the exhaust gas is routed first over a platinum-containing pre-catalyst and then over an SCR catalyst and the exhaust gas upstream of the pre-catalyst has an exhaust-gas temperature $T_E$, wherein the platinum-containing pre-catalyst includes a filter function for the soot particles contained in the exhaust gas and wherein at an exhaust-gas temperature $T_E$ below a predetermined temperature $T_1$, the ammonia is supplied to the exhaust gas either directly or in the form of a compound hydrolyzable to ammonia upstream of the pre-catalyst, and at an exhaust-gas temperature $T_E$ above $T_1$, ammonia supply to the exhaust gas is changed from a supply upstream of the pre-catalyst to a supply between the pre-catalyst and the SCR catalyst, wherein when the filter needs to be regenerated, the filter function of the pre-catalyst is regenerated by ammonia being oxidized at the pre-catalyst at an exhaust-gas temperature $T_A$ above 300° C. and the temperature of the pre-catalyst being raised above the soot ignition temperature by the released heat of oxidation.

2. The method according to claim 1, wherein the temperature $T_1$ for changing the ammonia supply is between 220 and 270° C.

3. The method according to claim 1, wherein the exhaust gas between the pre-catalyst and the SCR catalyst is routed over an additional hydrolysis catalyst and the ammonia or the compound hydrolyzable to ammonia is supplied to the exhaust gas upstream of the hydrolysis catalyst.

4. The method according to claim 1, wherein for oxidation of a possible ammonia leakage, the exhaust gas, after passing the SCR catalyst, is routed over an oxidation-active blocking catalyst.

5. The method according to claim 1, wherein the platinum-containing pre-catalyst includes an additional function for lowering the soot ignition temperature.

6. An exhaust-gas purification system for purifying the exhaust gas of a lean-burn internal combustion engine including a platinum-containing pre-catalyst and a downstream SCR catalyst, through which the exhaust gas successively passes, wherein the pre-catalyst is present in the form of a coating on a particulate filter and wherein a first metering device upstream of the pre-catalyst and a second metering device between the pre-catalyst and the SCR catalyst are provided for supplying ammonia or a compound hydrolyzable to ammonia to the exhaust gas of an internal combustion engine, wherein when the filter needs to be regenerated, the filter of the pre-catalyst is regenerated by ammonia being oxidized at the pre-catalyst at an exhaust-gas temperature above 300° C. and the temperature of the pre-catalyst being raised above a soot ignition temperature by the released heat of oxidation.

7. The exhaust-gas purification system according to claim 6, wherein the platinum-containing pre-catalyst includes platinum on at least one high surface area support selected from the group consisting of aluminum oxide, silicon oxide, titanium oxide, zirconium oxide, cerium oxide, zeolite or mixtures or mixed oxides thereof.

8. The exhaust-gas purification system according to claim 6, wherein the SCR catalyst includes a solid acid system on the basis of vanadium oxide, tungsten oxide and titanium oxide or vanadium oxide, molybdenum oxide and titanium oxide or on the basis of metal-exchanged zeolites.

9. The exhaust-gas purification system according to claim 6, wherein a hydrolysis catalyst is arranged between the second metering device and the SCR catalyst.

10. The exhaust-gas purification system according to claim 6, wherein a temperature sensor for the temperature of the exhaust gas is arranged upstream of the pre-catalyst.

11. The exhaust-gas purification system according to claim 6, wherein an oxidation catalyst is arranged downstream of the SCR catalyst.

12. The exhaust-gas purification system according to claim 11, wherein the oxidation catalyst is present in the form of a coating on the outlet side of the SCR catalyst and includes platinum on a high surface area support.

13. The exhaust-gas purification system according to claim 12, wherein the pre-catalyst includes platinum on at least one high surface area support selected from the group consisting of aluminum oxide, silicon oxide, titanium oxide, zirconium oxide, cerium oxide, zeolite or mixtures or mixed oxides thereof and additionally comprises components for lowering the ignition temperature of exhaust particulates.

* * * * *